US010576884B2

(12) United States Patent
Betz et al.

(10) Patent No.: US 10,576,884 B2
(45) Date of Patent: Mar. 3, 2020

(54) DEVICE AND METHOD FOR INTERIOR ILLUMINATION FOR A VEHICLE

(71) Applicant: DAIMLER AG, Stuttgart (DE)

(72) Inventors: Daniel Betz, Rottenburg-Seebronn (DE); Daniel Fuhrmann, Böblingen (DE); Michael Holz, Senden (DE); Juergen Ketterer, Böblingen (DE); Daniel Steffen Setz, Böblingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/096,856

(22) PCT Filed: Apr. 10, 2017

(86) PCT No.: PCT/EP2017/000454
§ 371 (c)(1),
(2) Date: Oct. 26, 2018

(87) PCT Pub. No.: WO2017/186339
PCT Pub. Date: Nov. 2, 2017

(65) Prior Publication Data
US 2019/0135172 A1 May 9, 2019

(30) Foreign Application Priority Data
Apr. 28, 2016 (DE) .................. 10 2016 005 062

(51) Int. Cl.
*B60Q 3/74* (2017.01)
*B60Q 3/20* (2017.01)
(Continued)

(52) U.S. Cl.
CPC .............. *B60Q 3/745* (2017.02); *B60Q 3/20* (2017.02); *B60Q 3/74* (2017.02); *B60Q 3/78* (2017.02); *B60Q 3/80* (2017.02)

(58) Field of Classification Search
CPC . B60Q 3/745; B60Q 3/80; B60Q 3/78; B60Q 3/20; B60Q 3/74
See application file for complete search history.

(56) References Cited

U.S. PATENT DOCUMENTS 8,876,343 B2   11/2014 Murray et al.
8,998,466 B2   4/2015 Wilfert
(Continued)

FOREIGN PATENT DOCUMENTS

DE   102010023811 A1   12/2011
DE   102011005967 A1   12/2011
(Continued)

OTHER PUBLICATIONS

International Search Report dated Jul. 4, 2017 in related International Application No. PCT/EP2017/000454.
(Continued)

*Primary Examiner* — Kevin Quarterman
(74) *Attorney, Agent, or Firm* — Patent Portfolio Builders PLLC

(57) ABSTRACT

A device for interior illumination for a vehicle includes an array formed by multiple light sources, with which an ambient illumination and a reading illumination can be generated inside the vehicle, an additional lamp unit with which exclusively an ambient illumination can be generated inside the vehicle, and a control unit for controlling the light sources and the additional lamp unit in three modes. The control unit is designed and configured in such a way that in the first mode the light sources are controlled in such a way that exclusively a reading illumination is generated inside the vehicle; in the second mode the light sources and the additional lamp unit are controlled in such a way that exclusively an ambient illumination is generated inside the vehicle; and in the third mode the control unit simultaneously activates the first and second modes for simultane- (Continued)

Figure 1:
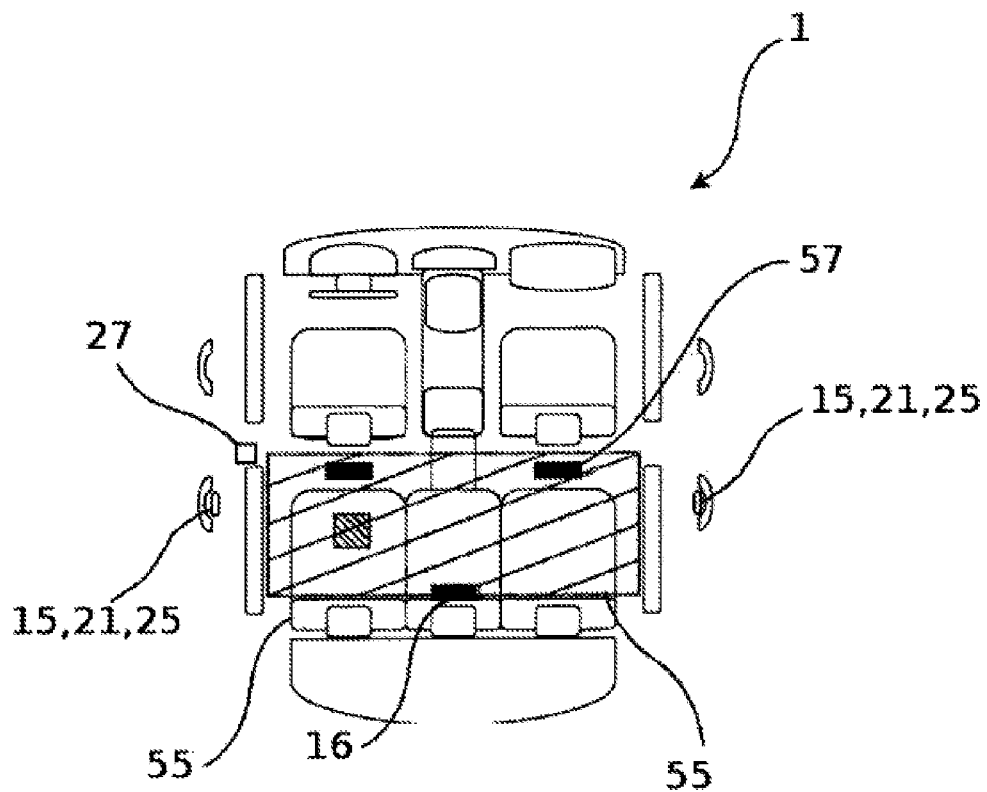

ously generating an ambient illumination and a reading illumination.

10 Claims, 1 Drawing Sheet

(51) Int. Cl.
*B60Q 3/78* (2017.01)
*B60Q 3/80* (2017.01)

(56) References Cited

U.S. PATENT DOCUMENTS

| | | | |
|---|---|---|---|
| 2005/0276056 A1* | 12/2005 | Tiesler | B60Q 3/82 |
| | | | 362/490 |
| 2008/0112175 A1 | 5/2008 | Bucher | |
| 2008/0198613 A1* | 8/2008 | Cruickshank | B60Q 1/323 |
| | | | 362/488 |
| 2009/0251912 A1 | 10/2009 | Kino et al. | |
| 2012/0307509 A1* | 12/2012 | Wimbert | B60N 2/0232 |
| | | | 362/464 |
| 2015/0138792 A1* | 5/2015 | Salter | B60Q 3/54 |
| | | | 362/510 |
| 2015/0138793 A1* | 5/2015 | Salter | B60Q 3/54 |
| | | | 362/510 |
| 2015/0343944 A1* | 12/2015 | Salter | H05B 37/0218 |
| | | | 362/510 |
| 2016/0152178 A1* | 6/2016 | Peterson | B60Q 3/80 |
| | | | 315/77 |
| 2017/0240106 A1* | 8/2017 | Briand | B60Q 3/74 |

FOREIGN PATENT DOCUMENTS

| | | |
|---|---|---|
| DE | 102011016420 A1 | 10/2012 |
| DE | 102012015039 A1 | 1/2014 |
| DE | 102014011095 A1 | 1/2016 |
| DE | 102015011891 A1 | 1/2017 |

OTHER PUBLICATIONS

Search Report created on Mar. 15, 2017 in related DE Application No. 10 2016 005 062.4.
Written Opinion dated Jul. 4, 2017 in related International Application No. PCT/EP2017/000454.

* cited by examiner

DEVICE AND METHOD FOR INTERIOR ILLUMINATION FOR A VEHICLE

BACKGROUND AND SUMMARY OF THE INVENTION

Exemplary embodiments of the invention relate to a device for interior illumination for a vehicle. The interior illumination in the vehicle can be used in principle for different purposes. A light cone for illuminating a predetermined limited spatial volume in the vehicle is typically generated for reading illumination. The reading illumination in this case illuminates a working space, for example for reading or writing. For ambient illumination, the entirety of the interior or portions of the interior of the vehicle are preferably evenly illuminated. Furthermore, self-luminous design elements in the vehicle interior are known which make various lighting arrangements possible.

DE 10 2012 015 039 A1 discloses an interior lamp for a vehicle comprising a lamp unit for forming the reading light and an additional lamp for forming an ambient illumination. The two lamp units are controlled by the same control unit depending on sensor signals containing information on the object to be illuminated. In this case, the lamp unit that forms the reading light comprises a plurality of light sources, which are preferably LEDs. The control device uses the light intensity of the object to be illuminated, which intensity is detected by a sensor unit, to control the brightness of the light intensity emitted by the lamp unit and the luminous field and to correctly illuminate the object.

A camera is required to control the illumination. There is no provision for different color temperatures or matched illuminances using other light sources.

The term "ambient illumination" is in the present case understood to mean illumination of the entire vehicle interior or of parts of the vehicle interior (for example, the rear region of the vehicle interior), which illumination is as even as possible and also diffuse. The ambient illumination therefore regulates virtually the entire brightness in the vehicle interior or at least of large contiguous regions of the vehicle interior.

The term "reading light" is in the present case understood to mean illumination, which is as even as possible, of a severely limited partial volume of the vehicle interior (in particular, the illumination of the reading or working region for a vehicle occupant). The brightness of the reading light is advantageously selected so as to facilitate fatigue-free working or reading.

Exemplary embodiments of the invention are directed to a device and a method for interior illumination for a vehicle which provide adaptive, flexible and favorable illumination of the vehicle interior.

A first aspect of the invention relates to a device for interior illumination for a vehicle. The device comprises one or more arrays, which in turn comprise a plurality of light sources. The surface density of the light sources on the array is preferably greater than or equal to one light source per square centimeter. The array preferably has a surface in the range of 10 cm$^2$ to 1000 cm$^2$. The array consists of a plurality of individual light sources; that is to say, at least two individual light sources form the array. In this case, a plurality of individual light sources is preferably used. In the simplest case, the array is designed as a linear array, so that the individual light sources are arranged in a row. The array is preferably two-dimensional, i.e., planar, the individual light sources being arranged in a 2D grid form. The light sources are preferably arranged in one plane on the array.

The spacing of the light sources from one another on the array can be constant over the entire array or vary over the array. The light sources of the array are designed in such a way that an ambient illumination and a reading illumination can be generated inside the vehicle by means of this array.

The device also comprises a lamp unit provided in addition to the array, by means of which lamp unit exclusively an ambient illumination within the meaning of the aforementioned definition can be generated inside the vehicle. Matrix illumination of the interior is thus not possible. As for the arrays, brightness and color temperature can also be changed for the additional lamp unit.

The device lastly comprises a control unit for controlling the light sources in the arrays and the additional lamp unit. In this case, the control unit is designed to adjust in order to selectively control individual light sources in the array and to adjust the brightness and a variety of color temperatures in the array.

The control unit is in this case designed and configured to implement three control modes (first mode, second mode, third mode). In the first mode, the light sources are controlled in such a way that exclusively a reading illumination is generated inside the vehicle by the array. In the second mode, the light sources of the array and the additional lamp unit are controlled in such a way that exclusively an ambient illumination is generated inside the vehicle. In the third mode, the first and the second mode are simultaneously activated by the control unit in order to simultaneously generate an ambient illumination and a reading illumination.

The disclosed device is suitable for illumination of the interior of various types of vehicles. The vehicle may be, for example, a passenger car or a minibus. The array consists of a plurality of individual light sources; that is to say, at least two individual light sources form the array. In this case, a plurality of individual light sources is preferably used. In the simplest case, the array is designed as a linear array, so that the individual light sources are arranged in a row. The array is preferably two-dimensional, i.e., planar, the individual light sources being arranged in a 2D grid form.

The term "inside the vehicle" or "vehicle interior" is in the present case understood in particular to mean the internal space of the vehicle that can be used by vehicle occupants. In passenger cars, the rear region of the vehicle interior is of particular interest. The vehicle can be a passenger car, heavy goods vehicle, bus, rail vehicle, watercraft (for example a ship), submarine vehicle, or an aircraft.

The additional lamp unit is advantageously arranged so as to be locally separated from the array and its individual light sources. The additional lamp unit advantageously evenly illuminates the entire rear region. The additional lamp unit advantageously generates a greater luminous flux based on the aperture angle of the beam path than the light sources of the array. The additional lamp unit advantageously comprises one or more LED elements, which each provide a higher luminous power than the individual light sources of the array.

One advantageous effect of the invention is that passengers in the rear region of a vehicle can use more favorable illumination conditions, in particular higher illuminances as a result of adding together the illuminances of the arrays and the additional lamp unit.

According to an advantageous embodiment, the lamp unit is arranged on a vanity mirror in the rear region of the vehicle or in the region of the vanity mirror in the rear region of the vehicle.

By way of example, a vanity mirror is attached to the rear side of the backrest of the driver's seat or of the passenger seat. In this case, the line of vision of a passenger sitting on the rear bench seat falls toward the vanity mirror. In this respect, the passenger on the rear bench seat can view themselves in the vanity mirror when the additional lamp unit is active, the light of the additional lamp unit being reflected from the vanity mirror at a minimum angle from the face of said passenger and with respect to the mirror. In the case of a minibus having a plurality of rear bench seats, a vanity mirror of this kind can for example also be attached at locations other than the rear side of the backrest of the driver's seat or passenger seat.

According to a further advantageous embodiment, the additional lamp unit is arranged between two rear seats in the rear region of the vehicle.

The expression "between two rear seats" can in this case refer to the immediate space for example between the portions of the backrest of the rear bench seat. However, the additional lamp unit can also be arranged on the roof of the vehicle, the expression "between the rear seats" then describing the position with respect to a lateral direction of the vehicle. An additional lamp unit can thus be placed above the rear seats and at the height of the boundary between two rear seats or two portions of the rear bench seat.

A further advantageous embodiment is characterized in that a plurality of the light sources of the array have a different emission characteristic, and the control unit is designed and configured in such a way that an emission characteristic of the array can be adjusted by selecting and activating individual light sources of the array. The term "emission characteristic" (also referred to as "directional characteristic") denotes in the present case the angular dependence of the intensity of the emitted luminous radiation.

By changing the emission characteristic of the array, the beam angle of the array can be adjusted, the beam angle typically defining the angle at which the emitted light intensity corresponds to 50% of the maximum light intensity (luminous intensity).

Advantageously, at least two of the individual light sources of the array are different. For example, the color temperature and/or the light color and/or the emission characteristic of the respective light sources can be different from one another. In this case, the array comprises a plurality of light sources, of which at least two have differing light beam angles. As a result of there being a plurality of light sources having beam angles that differ from one another, a main direction of the light beam direction of the array, that is to say the beam angle of the array, can be adjusted by specifically activating particular light sources. If, for example, four light sources point further upwards than four other light sources, an average main light beam direction of the array, which main light beam direction tends to point in the direction of the light sources directed upwards, can be achieved by turning on four of the light sources directed further upwards and turning on two of the light sources directed further downwards, without exploiting the upper maximum angle of the main light beam direction of the array. Depending on the number of individual light sources and the differences thereof with respect to the emission characteristic, a plurality of main light beam directions (beam angles of the array) can thus be generated. The beam angle of the array can in this case advantageously be continuously or gradually varied.

A further advantageous embodiment involves an optical element for beamforming being connected downstream of one or more of the light sources of the array in the light beam direction of these light sources. An optical element of this kind can, for example, comprise one or more lenses and a variable aperture. An aperture angle of a light cone, focusing of the beam path or a direction of the beam path that is generated by the array can thereby be adjusted.

Selecting and activating individual light sources of the array can facilitate targeted selective illumination (matrix illumination) of the interior. As a result, the reading light cone can, for example for the reading light, be freely positioned in terms of the position, size and shape thereof, without the use of mechanically moved parts.

An advantageous embodiment of the invention involves adjusting a luminous flux generated by the light sources and/or a color temperature and/or an illumination region generated by the array inside the vehicle.

An advantageous embodiment of the device involved adjusting a brightness generated by the light sources and/or a color temperature can be adjusted. By way of example, a color temperature of 3,000 Kelvin is conventional, which has a warm white hue. Higher color temperatures of, for example, 4,000 Kelvin are also conceivable, which represent a light color between warm white and neutral white, tending toward a daylight white. 6,000 Kelvin is also conceivable for a cold white light. Furthermore, individual light sources can either emit light in a variety of colors or individual light sources can each have a color that is however different from the other individual light sources. By specifically mixing individual light sources, light can be adjusted so as to have a different color temperature.

According to a further embodiment, the light sources of the array comprise at least one or more LEDs. In this case, the abbreviation LED refers to a "light-emitting diode." In order to generate different color temperatures, a light source of the array comprises, in each case, at least two or more LEDs, which emit light of different color temperatures. A light source advantageously comprises two to four LEDs.

Furthermore, individual light sources can either emit light in a variety of colors or individual light sources can each have a color that is however different from the other individual light sources. The first case can be comparable to an RGB pixel, this pixel generating the colors red, green and blue and it being possible for this pixel to represent a variety of colors in additive color mixing.

White light is mixed as follows: To this end, the color mixture should be made using white LEDs. Warm white LEDs and cold white LEDs are then used and mixed in order to adjust the color temperature of the white light.

According to a further embodiment, the control unit is designed in such a way that a luminous flux or brightness generated by the additional lamp unit and/or a color temperature can be adjusted.

Both the array together with its light sources and the additional lamp unit can therefore preferably be adjusted in terms of the light color and brightness thereof. The control unit is therefore preferably designed in such a way that the brightness of the light sources of the array, the color temperature of the light sources of the array, and the brightness and/or the color temperature of the additional lamp unit can be adjusted.

The term "luminous flux" describes an energy per time unit, that is to say an amount of light per time that originates from the additional lamp unit. As for the individual light sources, the color temperature can also be changed for the additional lamp unit. The control unit can in this case adjust the color temperature of the beam path of the additional lamp unit by specifically activating or mixing individual light sources that emit light in different colors. A variety of color temperatures can therefore be adjusted. The brightness of the additional lamp unit can also be adjusted. This can be achieved, for example, by adjusting the electrical voltage applied to the additional lamp unit or by adjusting the current. In the case of alternating current, the additional lamp unit can also be dimmed by cutting the phase. The additional lamp unit can preferably be dimmed, irrespective of the type of power supply, positioning or other conditions.

Both the array together with its light sources and the additional lamp unit can therefore preferably be adjusted in terms of the light color and brightness thereof. The control unit is therefore preferably designed in such a way that the luminous flux of the light sources of the array, the color temperature of the light sources of the array, and the luminous flux and/or the color temperature of the additional lamp unit can be adjusted.

The light color, color temperature and brightness are advantageously regulated by one or more sensors in the vehicle interior measuring a current illuminance, a current luminous flux and/or a current light color and transmitting these as sensor information to the control unit in order to regulate these parameters to predetermined desired parameters. The light color is adjusted either by directly controlling colored LEDs or by regulating by means of color-sensitive light sensors. A predominant color temperature and illuminance can, for example, be adjusted in the illumination by means of this feedback.

A sensor is advantageously provided for detecting an illuminance in the immediate vehicle surroundings. The measured values of the control unit that are generated by this sensor are advantageously provided and used to regulate the light sources of the array and/or the additional lamp unit. In particular, it is thus possible to adapt the brightness of the ambient illumination and reading illumination generated in the interior to a surrounding brightness predominant outside the vehicle. This adaptation is advantageously achieved automatically.

The control unit is advantageously connected to an input interface, via which a user can adjust parameters such as brightness of the interior illumination, orientation and positioning of the volume illuminated by the reading illumination, and desired light color, as well as select one of the three modes.

According to a further embodiment, the light sources of the array comprise at least one or more LEDs. In this case, the abbreviation LED refers to a "light-emitting diode." In order to generate different color temperatures, a light source of the array comprises, in each case, at least two or more LEDs which emit different light colors. A light source advantageously comprises three or four LEDs.

A further aspect of the invention relates to a method for interior illumination for a vehicle, comprising: at least one array formed by a plurality of light sources, by means of which array an ambient illumination and a reading illumination can be generated inside the vehicle; an additional lamp unit by means of which exclusively an ambient illumination can be generated inside the vehicle; and a control unit for controlling the light sources and the additional lamp unit in three modes. The control unit is designed in such a way that in the first mode, the light sources are controlled in such a way that exclusively a reading illumination is generated inside the vehicle, that in the second mode, the light sources and the additional lamp unit are controlled in such a way that exclusively an ambient illumination is generated inside the vehicle, and that in the third mode, the first and the second mode are activated simultaneously.

Advantages and preferred developments of the proposed method can be found by conveying, in an analogous and corresponding manner, the embodiments previously made in conjunction with the proposed device.

A further aspect of the invention relates to a vehicle comprising a device as described above and in the following.

Further advantages, features and details can be found in the following description, in which at least one embodiment is described in detail, optionally with reference to the drawings. Parts which are identical, similar and/or functionally identical are provided with the same reference numbers.

BRIEF DESCRIPTION OF THE DRAWING FIGURES

Figure 2:
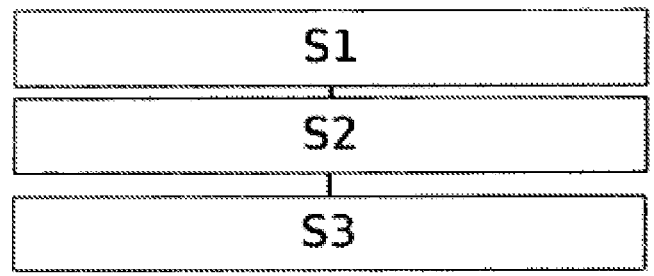

In the drawings:

FIG. 1 shows a vehicle comprising a device for interior illumination for the vehicle according to one embodiment of the invention, and FIG. 2 shows a method for interior illumination for the vehicle according to a further embodiment of the invention.

The views in the drawings are schematic and not to scale.

DETAILED DESCRIPTION

FIG. 1 shows a section of a vehicle 1, the viewer seeing the inside of the vehicle 1 from above. The vehicle front can be seen in the figure in the upper half of the image. A device for interior illumination is provided in the rear region of the vehicle 1, that is to say in the region of the rear bench seat 55 or the rear bench seats 55. This device preferably has two arrays 15, which each comprise a plurality of light sources 21. An ambient illumination and a reading illumination can be generated inside the vehicle 1 by means of this array 15. In contrast to the reading illumination, an ambient illumination produces a more diffuse light illuminating the rear region more evenly than the reading light. However, the reading light illuminates a certain region more brightly than other regions; it directs the illumination at a particular angle such that a passenger can expect a greater illuminance, for example, at chest height or eye height than, for example, in the foot region or in the regions next to the passenger. In this example, the arrays 15 may consist of individual LED elements 21 and be fastened to the vehicle roof close to the grab handles. These LED elements can be controlled in such a way that they generate either an ambient illumination or a reading illumination, or a mixture of the two. This is achieved by a control system provided therefor by means of a control unit 27. Furthermore, this device comprises an additional lamp unit 16, by means of which exclusively an ambient illumination can be generated inside the vehicle 1. The additional lamp unit 16 is in this case preferably arranged between two rear seats 55. However, the additional lamp unit 16 can also be located in the region of a vanity mirror 57. A control unit 27 also controls the additional lamp unit 16 in addition to the light sources 21. In this case, different modes can either be selected by a user or are automatically activated by means of a pre-implemented logic. A first mode only generates a reading illumination in the rear region of the vehicle. The light sources 21 are correspondingly controlled in a first mode. The control system is therefore designed in such a way that the illuminance for an occupant of the vehicle 1 is high enough for reading and is present at least in the region where a book, newspaper or the like is typically held. A region of this kind usually extends between the hips and the shoulders, in particular at chest height of the passenger. However, in a second mode, the light sources 21 and the additional lamp unit 16 exclusively generate an ambient illumination. The control unit 27 in this case coordinates the light sources 21 and the additional lamp unit 16. Moreover, the control unit 27 can switch into a third mode, which is used to simultaneously generate an ambient illumination and a reading illumination. In this case, the first and the second mode are activated simultaneously, that is to say that, in this third mode, the first mode and the second mode are superimposed. Light sources 21 can comprise one or more optical elements 25 as further adjustment options. An optical element 25 changes the beam path of the light emitted from a light source 21, for example with respect to the aperture angle or direction thereof.

FIG. 2 shows a method given by way of example for interior illumination of a vehicle 1, the control unit 27 in a first mode controlling S1 the light sources 21 in such a way that exclusively a reading illumination is generated inside the vehicle 1, in a second mode controlling S2 the light sources 21 and the additional lamp unit 16 in such a way that exclusively an ambient illumination is generated inside the vehicle 1, and in a third mode controlling S3 the light sources 21 and the additional lamp unit 16 in such a way that a reading illumination and an ambient illumination are generated inside the vehicle 1.

Although the invention has been illustrated and explained in greater detail by means of preferred embodiments, the invention should not be limited by the disclosed examples, and other variations can be derived therefrom by a person skilled in the art without departing from the scope of protection of the invention. It is therefore clear that there are numerous possibilities for variation. It is likewise clear that embodiments given by way of example merely constitute examples which should not be taken in any way as a limitation of the scope of protection, the range of possible uses or the configuration of the invention. Instead, the preceding description and the description of the figures enable a person skilled in the art to practically implement the embodiments given by way of example, it being possible for a person skilled in the art, in knowledge of the disclosed concept of the invention, to make multiple changes, for example with regard to the function or the arrangement of individual elements mentioned in an embodiment given by way of example, without departing from the scope of protection, which is defined by the claims and the legal equivalents thereof, such as further explanation in the description.

The invention claimed is:

1. A device for interior illumination for a vehicle, the device comprising:
   at least one array formed by a plurality of light sources, wherein the array is configured to generate an ambient illumination and a reading illumination inside the vehicle;
   an additional lamp unit configured to exclusively generate an ambient illumination inside the vehicle;
   a first sensor arranged inside the vehicle and configured to measure a current illuminance, a current luminous flux, and/or a current light color;
   a second sensor arranged to measure an illuminance in immediate vehicle surroundings; and
   a control unit configured to control the plurality of light sources and the additional lamp unit in three modes, wherein the control unit is designed and configured in such a way that in the
      first mode, the light sources are controlled to generate only a reading illumination inside the vehicle,
      second mode, the light sources and the lamp unit are controlled to generate only an ambient illumination is generated inside the vehicle, and
      third mode, the control unit simultaneously activates the first and the second mode to simultaneously generate the ambient illumination and the reading illumination inside the vehicle,
      wherein the control unit is further configured to adapt a brightness of the reading and ambient illumination based on the measurements of the first and second sensors.

2. The device of claim 1, wherein the additional lamp unit is arranged on a vanity mirror in a rear region of the vehicle.

3. The device of claim 1, wherein the additional lamp unit is arranged between two rear seats in a rear region of the vehicle.

4. The device of claim 1, wherein at least some of the plurality of the light sources have a different emission characteristic, and the control unit is configured to adjust an emission characteristic of the array by selecting and activating individual light sources of the plurality of light sources.

5. The device of claim 1, further comprising:
   an optical element configured for adjustable beamforming is connected downstream of one or more of the plurality of light sources in a light beam direction of the one or more of the plurality of light sources, and the control unit controls the optical element for beamforming.

6. The device of claim 1, wherein the control unit is configured to adjust a luminous flux or brightness generated by the plurality of light sources, a color temperature, and/or an illumination region generated by the array inside the vehicle.

7. The device of claim 1, wherein the control unit is configured to adjust a luminous flux or brightness generated by the additional lamp unit and/or a color temperature.

8. The device of claim 1, wherein each the plurality of light sources comprise one or more light-emitting diodes LED.

9. A method for interior illumination for a vehicle, the method comprising:
   controlling, by a control unit, the interior illumination for the vehicle to be in a first illumination mode in which a plurality of light sources of at least one array generates only a reading illumination inside the vehicle;
   controlling, by the control unit, the interior illumination for the vehicle to be in a second illumination mode in which the plurality of light sources and an additional lamp generate only an ambient illumination inside the vehicle;
   controlling, by the control unit, the interior illumination for the vehicle to be in a third illumination mode in which the first and second illumination modes are activated simultaneously; and
   adapting, by the control unit based on a current illuminance, a current luminous flux, and/or a current light color measured by a first sensor arranged inside the vehicle and an illuminance in immediate vehicle surroundings measured by a second sensor, a brightness of the reading and ambient illumination.

10. A vehicle, comprising:
   an interior; and
   a device for illumination of the interior, the device comprising at least one array formed by a plurality of light sources, wherein the array is configured to generate an ambient illumination and a reading illumination inside the vehicle;

an additional lamp unit configured to exclusively generate an ambient illumination inside the vehicle; and a control unit configured to control the plurality of light sources and the additional lamp unit in three modes, wherein the control unit is designed and configured in such a way that in the first mode, the light sources are controlled to generate only a reading illumination inside the vehicle, second mode, the light sources and the lamp unit are controlled to generate only an ambient illumination is generated inside the vehicle, and third mode, the control unit simultaneously activates the first and the second mode to simultaneously generate the ambient illumination and the reading illumination inside the vehicle, wherein the at least one array is fastened to a roof of the vehicle and the additional lamp unit is arranged between two rear seats in a rear region of the vehicle or is arranged on a vanity mirror in the rear region of the vehicle.

* * * * *